United States Patent [19]
Heinecke

[11] 3,986,404
[45] Oct. 19, 1976

[54] VORTEX AMPLIFIER APPARATUS

[75] Inventor: Richard L. Heinecke, Minnetonka, Minn.

[73] Assignee: Honeywell Inc., Minneapolis, Minn.

[22] Filed: Sept. 25, 1964

[21] Appl. No.: 400,638

[52] U.S. Cl. .............................. 73/505; 137/812; 235/200 R
[51] Int. Cl.² ........................................ G01P 15/00
[58] Field of Search ............. 73/194, 505; 137/81.5

[56] References Cited
UNITED STATES PATENTS

| | | | |
|---|---|---|---|
| 3,213,682 | 10/1965 | Gungwer | 73/170 |
| 3,240,060 | 3/1966 | Doyle | 73/194 |

FOREIGN PATENTS OR APPLICATIONS

| | | | |
|---|---|---|---|
| 1,318,907 | 1/1963 | France | |

*Primary Examiner*—Samuel Feinberg

EXEMPLARY CLAIM

1. In a vortex amplifier:
   a first element having a first outlet passage therein;
   a second element having a second outlet passage therein;
   porous coupling means, said first element, said second element and said coupling means cooperating to form a chamber symmetrical about an axis, said first outlet passage being substantially aligned with said axis and in communication with said chamber, said second outlet passage being substantially aligned with said axis and in communication with said chamber, said amplifier adapted to be connected to a fluid source whereby a fluid flows through said coupling means, through said chamber and exhausts through said first outlet passage and said second outlet passage; and
   readout means including an elongated member having a plurality of vanes thereon, said vanes being equally spaced around the periphery of said member, said vanes extending axially over a major portion of the length of said member, one end of said member cooperating with said first outlet passage so as to form a first poppet, the other end of said member cooperating with said second outlet passage so as to form a second poppet, said first poppet and said second poppet cooperating with the fluid to provide fluid support of said member within said chamber and to substantially align said member with said axis, and said readout means further including means for providing an output signal indicative of the rotation of said member relative to said first element in response to vortical fluid flow within said chamber.

4 Claims, 3 Drawing Figures

INVENTOR.

BY Roger W. Jensen

VORTEX AMPLIFIER APPARATUS

This invention pertains to vortex pure fluid amplifiers and more particularly to readout means for vortex pure fluid amplifiers.

A vortex fluid amplifier comprises a device which functions to provide amplification of a fluid input signal by means of vortical fluid flow. The applicant's invention will be described as utilized in a specific embodiment of a vortex fluid amplifier referred to as a vortex rate sensor. The invention is by no means limited to such an application.

A vortex rate sensor is an apparatus which is capable of sensing the angular velocity (rate) about an axis of a body upon which the vortex rate sensor is applied. The measurement of the angular velocity (rate) is, as is well understood, useful and/or necessary in many control systems. For example, an angular rate signal is useful in gun aiming or north-seeking systems and in automatic flight and/or attitude control systems for aircraft and spacecraft.

Structurally a vortex rate sensor generally comprises a means defining a cylindrical chamber including coupling means positioned around the periphery of the chamber. Exhaust passages are centrally positioned within the chamber. The sensor is adapted to be connected to a fluid source whereby a fluid flows from said fluid source through the coupling means, through the chamber, and exhausts through the exhaust passages.

In the absence of any rate input, the fluid flow through the chamber approximates the classical two-demensional pure sink flow. Fluid flow in such a pure sink flow has only radial velocity. The term radial velocity is defined for purposes of this specification as meaning velocity directed towards the center axis and is not limited to a direction perpendicular to the axis. When the sensor is subjected to a rate (angular velocity) about its input axis, the coupling ring functions to couple this rate to the fluid. Thus a tangential or rotational velocity is super-imposed upon the radial velocity of the fluid. The super-imposition of the tangential velocity upon the radial velocity results in a vortical fluid flow through the chamber. That is, fluid flow in which the fluid streamline pattern is a spiral.

Due to the principle of the conservation of angular momentum, the tangential velocity of the fluid will increase as the flow approaches a central outlet passage. Consequently, the vortex rate sensor functions to amplify the input signal (angular velocity). Various amplificational levels may be obtained by varying the geometry of the vortex rate sensor.

As indicated, a rate input superimpositions the tangential velocity upon the radial velocity of the fluid flowing through the rate sensor chamber. Consequently, a measurement of the input rate may be obtained, by sensing the effect of the rate input upon the fluid flow field through the chamber of the vortex rate sensor. However, it is extremely difficult in practice to sense the effect of the rate input upon the fluid flow field without destroying such effect. That is, it is extremely difficult to utilize a readout means which is capable of sensing the effect of the rate input upon the fluid flow field without disturbing the fluid flow field and thus losing the desired information.

The applicant provides a unique readout or pickoff means for sensing the effect of a rate input upon the fluid flow field in the chamber of a vortex amplifier. More specifically, in one embodiment of the invention an elongated member is positioned within the chamber aligned with the input axis of the fluid amplifier. The ends of the elongated member form a poppet, so that fluid flowing through the chamber cooperates with the poppets so as to provide fluid support of the elongated member. A plurality of vanes are provided upon the elongated member. A fluid flowing through the chamber impinges upon the vanes of the elongated member and tends to rotate the member relative to the means defining the chamber. The amount of rotation of the elongated member is indicative of the input rate to the vortex rate sensor.

The scope of the applicant's invention will become apparent from a study of the specification and claims in conjunction with the drawings in which:

Figure 1:
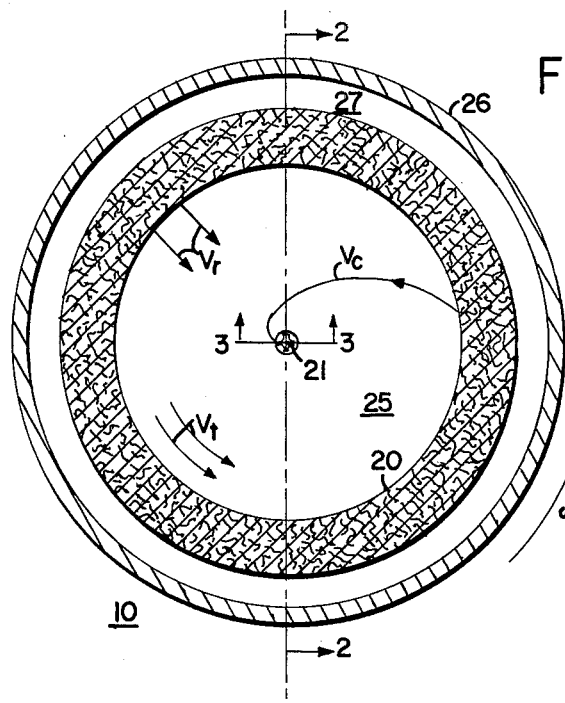
FIG. 1 is a cross sectional view of a vortex rate sensor taken along section line 1—1 of FIG. 2.
Figure 2:
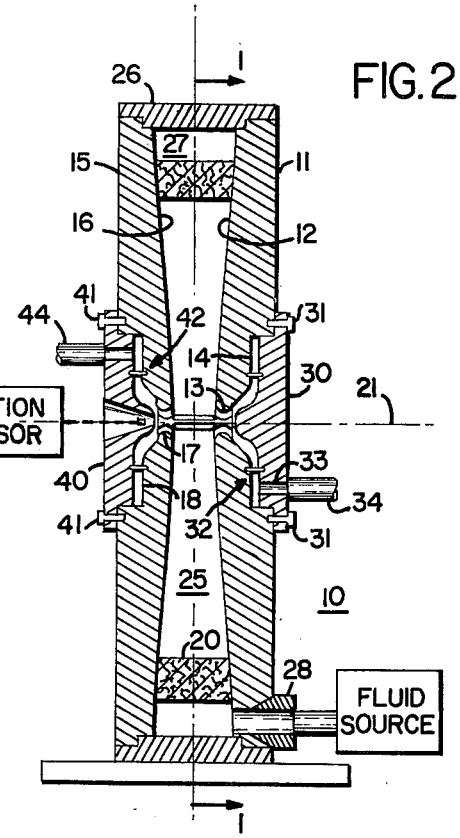
FIG. 2 is a cross sectional view taken along section line 2—2 of FIG. 1.

Referring now to FIGS. 1 and 2, reference numeral 10 generally depicts a vortex rate sensor. A cylindrical element 11 is provided having a tapered surface 12 thereon. A second cylindrical element 15 is provided having a tapered surface 16 thereon. An annular porous coupling means 20 is positioned between surface 12 of element 11 and surface 16 of element 15. The term porous as utilized in this specification means permeable to fluids. Coupling means 20 is porous in nature so as to allow fluid to pass therethrough. Coupling means 20 is symmetrical about an axis 21. In one particular embodiment, porous coupling means 20 is constructed of sintered metal, however it is also possible to utilize other porous material such as screens, ceramics, and the like. When the applicant's pickoff is utilized in conjunction with a vortex amplifier other than a rate sensor, fluid jets or other means are provided for introducing a component of fluid flow perpendicular to the axis 21. In the specific embodiment illustrated in FIGS. 1 and 2, coupling means 20 maintains surfaces 12 and 16 in a spaced relationship. The space between surfaces 12 and 16 increases as the radial distance from axis 21 increases. It is not necessary for the operation of the applicant's invention that surfaces 12 and 16 be maintained in a particular relationship illustrated in FIGS. 1 and 2. It is also possible to maintain surfaces 12 and 16 in other orientations, for example parallel or tapered outwardly.

Plate elements 11 and 15 in conjunction with coupling means 20 collectively define a vortex chamber 25. The outer periphery of chamber 25 is defined by porous coupling means 20. The ends of chamber 25 are defined by surface 12 of element 11 and surface 16 of element 15. It is not necessary that vortex chamber 25 be tapered as illustrated in FIGS. 1 and 2. A generally cylindrically shaped element 26 is positioned around the outer periphery of elements 11 and 15 enclosing the space therebetween. Element 26 is rigidly attached to elements 11 and 15 by suitable means (not shown) such as screws or adhesives. Element 26 is spaced apart from coupling means 20 in conjunction therewith defines a manifold 27 between elements 11 and 15. A fluid is supplied to manifold 27 through a connector 28 which is connected to a fluid source.

Figure 3:
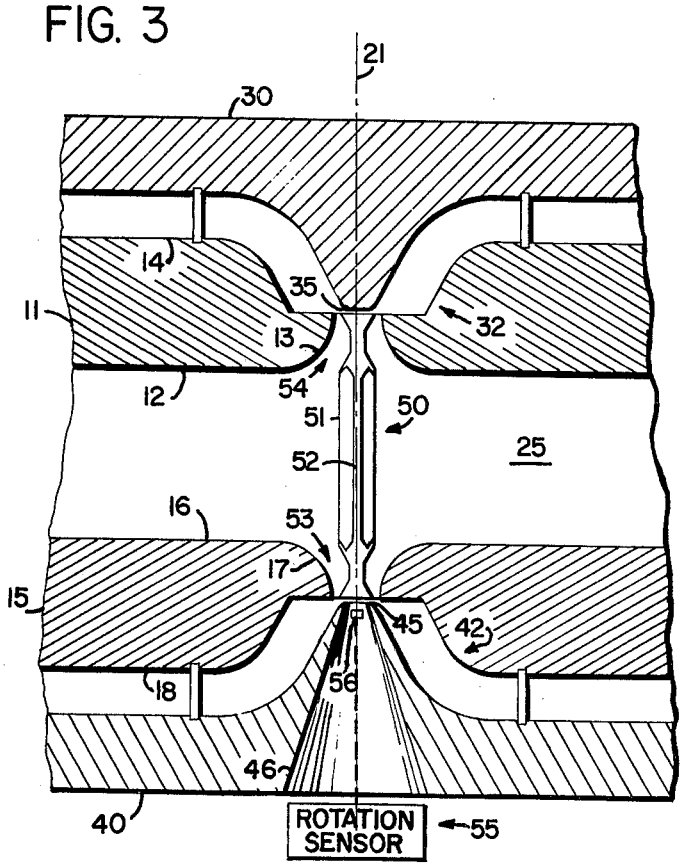
FIG. 3 is an enlarged cross sectional view taken along section line 3—3 of FIG. 1.

Referring now to FIG. 3, like elements are identified with the same reference numerals as utilized in FIGS. 1 and 2. Element 11 has a central opening 13 therein having a circular cross section. Opening 13 is substantially aligned with axis 21. Element 11 also has a generally cylindrically shaped recess 14 therein. A cover member 30 is positioned over recess 14 and rigidly attached to element 11 by screws 31. Opening 13, recess 14, and cover member 30 cooperate to form an outlet passage 32 within element 11. An opening 33 through cover member 30 connects outlet passage 32 to an exhaust passage 34.

Element 15 has a central opening 17 therein which is aligned with axis 21. Element 15 also has a generally cylindrically shaped recess 18 therein. A cover member 40 is positioned over recess 18 and attached to member 15 by means of screws 41. Opening 17, recess 18, and cover member 40 cooperate to form an exhaust passage 42 within element 15. An opening 43 within cover member 40 connects outlet passage 42 to exhaust conduit 44.

A readout means 50 is provided including an elongated member 51, symmetrical about its longitudinal axis. Elongated member 51 has a plurality of vanes 52 thereon. For optimum results, elongated member 50 is fabricated from a material which has a density which substantially matches the density of the fluid to be utilized. Each end of elongated member 51 is shaped so as to form a poppet 53 and 54. Poppets 53 and 54 coact with the fluid so as to provide fluid support for the elongated member 51 within chamber 25 and to substantially align member 51 with axis 21. Elongated member 51 is not in contact with any of the surrounding structural members when so supported by the fluid. Cover member 30 has a plane surface 35 positioned contiguous to and spaced apart from poppet 54 (one end of elongated member 51). Cover member 40 has a plane surface 45 positioned contiguous to and spaced apart from poppet 53 (the other end of elongated member 51). Surfaces 35 and 45 limit the axial displacement of elongated member 51.

Fluid member 40 has an opening 46 therethrough which is substantially aligned with axis 21. Means are provided to sense the relative rotation between member 51 and element 15 through opening 46. This may be accomplished by placing an index mark on the end of poppet 53 and a graduated scale on element 15 and observing the rotation. However in many cases it is desirable to provide rotation sensing means to produce an output signal indicative of the relative rotation of elongated member 51 and element 15. Various types of rotation sensors may be utilized to perform this function. One such rotation sensor 55 utilizes a capacitive probe, such as schematically illustrated by reference numeral 56 in FIGS. 2 and 3. A portion of poppet 53 is utilized as a corresponding capacitive plate. A digital output signal is obtained upon relative rotation of elongated member 50 and element 15.

In operation, a fluid flows to manifold 27 from the fluid source. A pressure differential exists between manifold 27 and outlet passages 32 and 42. Consequently, a fluid flows from manifold 27 through coupling means 20, through chamber 25, and exhausts through outlet passages 32 and 42. In the absence of any rate input (angular velocity) about axis 21 the fluid flow field comprises only a radial velocity as illustrated by radial vectors $V_R$ in FIG. 1. When vortex rate sensor 10 is subjected to an input rate, $\omega$, as indicated by the arrow in FIG. 1, coupling means 20 is also subjected to this rate. The fluid within coupling means 20 is given a tangential or rotational component of velocity as the fluid passes through the coupling means. The rotational or tangential velocity of the fluid is illustrated by vectors $V_T$ in FIG. 1. The superimposition of the tangential velocity upon the radial velocity results in a fluid flow field in which the fluid streamline pattern is a spiral, $V_C$, as illustrated in FIG. 1. The fluid flowing through chamber 25 in the spiral pattern exhausts through outlet passages 32 and 42. The tangential or rotational velocity $V_T$ imparted to the fluid within coupling means 20 by the rate input, is amplified as the fluid approaches the center (axis 21) of chamber 25 and is indicative of the rate input. Consequently, it is possible to sense the input rate $\omega$ by determining the sense and magnitude of the fluid flow about axis 21.

As the fluid flows through chamber 25 it flows around poppets 53 and 54 so as to support and align elongated member 51. Member 51 is thus floating in the vortex rate sensor fluid, and no additional power is required to support elongated member 51. Poppet type support provides less drag than other fluid bearings. Poppets 53 and 54 have an inherent self-aligning property. In addition the poppets utilize relatively large clearances so that the problems associated with contamination and with the expansion of the plate elements when the vortex chamber is pressurized are significantly reduced. The integration of the support of the readout means into the vortex rate sensor allows a fluid signal pickoff at a small diameter (higher amplification) while maintaining large outlet passage size for faster response and higher efficiency. The shock resistance of the poppet type bearing is excellent; not only will the bearing stiffness counteract any accelerations, but squeeze film effects will act under high G loads.

With no input rate the fluid flow in chamber 25 is radial velocity only. Thus the fluid impinges vanes 52 of member 51 so that the resultant force thereon is zero. That is, the fluid flowing within chamber 25 exerts no torque upon element 51 and there is no relative rotation of element 51 relative to plate 15. There is no output signal from the rotation sensor in the absence of any rate input.

However, when vortex rate sensor 10 is subjected to a rate input $\omega$, the fluid flows through chamber 25 in a spiral pattern and impinges upon elongated member 51 and applies a torque thereto causing rotation thereof. It can be shown that the amount of rotation of member 51 is a function of the input rate $\omega$. That is, the amount of rotation of elongated element 51 is indicative of the input rate $\omega$, when the fluid flow is held constant. With the counterclockwise rate input $\omega$ illustrated in FIG. 1, elongated member 20 will rotate in a counterclockwise direction. The rotation of member 50 will be reversed when the input rate is reversed. Thus the sense of the applied input rate can be established by the direction of rotation of the elongated member 51. The magnitude of the input rate $\omega$ is determined by the amount of rotation of elongated member 51. Rotation sensor 55 provides an output signal indicative of the direction and magnitude of the rotation of elongated member 50.

Although the invention has been described and illustrated in detail it is to be clearly understood that this is by way of illustration and example only and is not to be taken by way of limitation. The scope of the invention is limited only by the scope of the appended claims.

What is claimed is:

1. In a vortex amplifier:
a first element having a first outlet passage therein;

a second element having a second outlet passage therein;

porous coupling means, said first element, said second element and said coupling means cooperating to form a chamber symmetrical about an axis, said first outlet passage being substantially aligned with said axis and in communication with said chamber, said second outlet passage being substantially aligned with said axis and in communication with said chamber, said amplifier adapted to be connected to a fluid source whereby a fluid flows through said coupling means, through said chamber and exhausts through said first outlet passage and said second outlet passage; and readout means including an elongated member having a plurality of vanes thereon, said vanes being equally spaced around the periphery of said member, said vanes extending axially over a major portion of the length of said member, one end of said member cooperating with said first outlet passage so as to form a first poppet, the other end of said member cooperating with said second outlet passage so as to form a second poppet, said first poppet and said second poppet cooperating with the fluid to provide fluid support of said member within said chamber and to substantially align said member with said axis, and said readout means further including means for providing an output signal indicative of the rotation of said member relative to said first element in response to vortical fluid flow within said chamber.

2. In a vortex amplifier:

a first element having a first outlet passage therein;

a second element having a second outlet passage therein;

porous coupling means, said first element, said second element and said coupling means cooperating to form a chamber symmetrical about an axis, said first outlet passage being substantially aligned with said axis and in communication with said chamber, said second outlet passage being substantially aligned with said axis and in communication with said chamber, said amplifier adapted to be connected to a fluid source whereby a fluid flows through said coupling means, through said chamber and exhausts through said first outlet passage and said second outlet passage; and readout means including an elongated member having a plurality of vanes thereon, one end of said member cooperating with said first outlet passage so as to form a first poppet, the other end of said member cooperating with said second outlet passage so as to form a second poppet, said first poppet and said second poppet cooperating with the fluid to provide fluid support of said member within said chamber and to substantially align said member with said axis, and said readout means further including means for providing a signal indicative of the rotation of said member relative to said first element.

3. In a vortex amplifier:

means defining a chamber symmetrical about an axis with a peripheral fluid inlet and a pair of central fluid outlets therein, said chamber adapted to be connected to a fluid source whereby a fluid flows through said inlet and exhausts through said pair of outlet passages; and readout means including an elongated member having a plurality of vanes thereon, one end of said member cooperating with one of said pair of outlet passages so as to form a first poppet, the other end of said member cooperating with the other of said pair of outlet passages so as to form a second poppet, the flow of fluid around said first poppet and said second poppet being effective to provide fluid support of said member within said chamber and to substantially align said member with said axis, and said readout means further including means for indicating the rotation of said member relative to said means defining said chamber in response to vortical fluid flow within said chamber.

4. In a vortex amplifier:

means defining a chamber symmetrical about an axis, said chamber having a fluid inlet and a pair of fluid outlets substantially aligned with said axis, said inlet being adapted to be connected to a fluid source whereby a fluid flows through said chamber and exhausts through said pair of outlet passages; and readout means including a rotatable member and rotation sensing means, said member having a plurality of vanes thereon, each end of said rotatable member cooperating with one of said pair of fluid outlet passages so as to form a fluid bearing, said member being supported within said chamber and substantially aligned with said axis by the flow of fluid through said chamber and out of said pair of outlet passages, and said rotation sensing means indicating the rotation of said member relative to said means defining said chamber.

* * * * *